United States Patent [19]

Gunther et al.

[11] Patent Number: 4,770,093
[45] Date of Patent: Sep. 13, 1988

[54] GATE-CONTROLLED RAMP FOR BALE DISCHARGED FROM ROUND BALER

[75] Inventors: Daniel Gunther, Morsbach; Jean Viaud, Sarrequemines; Renè Laberheim, Eschviller, all of France

[73] Assignee: Deere & Company, Moline, Ill.

[21] Appl. No.: 108,329

[22] Filed: Oct. 14, 1987

[30] Foreign Application Priority Data

Oct. 20, 1986 [GB] United Kingdom ............... 8625127

[51] Int. Cl.$^4$ ........................................... A01D 39/00
[52] U.S. Cl. .................................................... 100/8.8
[58] Field of Search ................... 100/88, 218; 56/341

[56] References Cited

U.S. PATENT DOCUMENTS 4,458,587  7/1984  Jennings ............................. 100/88
4,470,247  9/1984  Mast ................................. 100/88 X

FOREIGN PATENT DOCUMENTS 2138354  10/1984  United Kingdom .

*Primary Examiner*—Andrew M. Falik

[57] ABSTRACT

A baling machine for forming large cylindrical bales of hay has a gate which can be raised to an open position for enabling a completed bale to pass under it for discharge. Upon initial opening of the gate, the bale initially rests on a horizontal support which is connected by a cable and link to the gate. On the gate being raised further, the moving gate pulls the support via the cable and link so that it swings downwardly in a rearward direction to form a discharge ramp along which the bale may roll onto the ground and beneath that gate. The arrangement is such, however, that in hilly terrain the gate can be opened initially to an intermediate position corresponding to an intermediate swinging position of the support so that the bale runs down the support and either lodges against the gate before or after it contacts the ground. On either event the gate stops the bale from rolling. The gate is then raised further and the machine driven away from the bale which therefore does not have unwanted momentum derived from rolling down the support which would increase the tendency of the bale to roll too far over the sloping ground.

8 Claims, 2 Drawing Sheets

GATE-CONTROLLED RAMP FOR BALE DISCHARGED FROM ROUND BALER

BACKGROUND OF THE INVENTION

This invention relates to a baling machine for forming cylindrical bales of crop and more particularly relates to a support forming a ramp for bales discharged from such machines.

Machines, towed by a tractor, for forming large cylindrical bales of hay (so called "round balers") are well-known. As the machine advances, the crop is removed from a windrow by a pick-up mechanism and delivered rearwardly to a baling chamber where it is rolled into a bale.

There are basically two forms of such machines, namely those with a fixed volume baling chamber defined by driven fixed-position rolls and those with a baling chamber defined by runs of driven belts which move outwardly to enlarge the chamber to accommodate the bale as it grows in size. In both forms, the hay is caused by the driven movement of the rolls or belts to roll around upon itself into a core and the core rotates about its horizontal axis and finally a completed bale is formed, the chamber being fed throughout with hay. The completed bale is tied with twine to maintain its shape and is discharged by rolling through a gate formed by a rear portion of the machine.

The gate is swingable about a horizontal pivot axis located at the top of the baler so that the gate moves rearwardly and upwardly from a closed position in which it is approximately vertical to a fully open position at an angle of about sixty degrees to the vertical at which the completed bale can pass freely under it.

At discharge, however, a bale can foul the gate if the latter is not sufficiently open before ejection starts. The rolling movement of the bale from the machine is then slowed and although the bale may nevertheless be discharged once the gate gains its fully open position, the bale tends not to roll away from the gate on reaching the ground. In these circumstances when the gate closes it will foul the bale lying below it, and so the baler has to be maneuvered to clear this obstruction before the gate can be shut with consequent loss of time in the harvesting operation.

In GB-A No. 2 138 354 it has been proposed to provide a horizontal grid supporting the bale which is triggered to move to a downwardly inclined position immediately once opening of the gate has started. After discharge, an automatic signal indicates to the driver whether the bale is clear of the gate swing area. The grid extends far beyond the rear of the machine when the gate is closed so that the bale would probably be deposited sufficiently clear of the gate generally to enable closure without fouling. However, this adds significantly to the overall length of the machine, and a fully formed bale can still foul the gate during its opening phase.

In our co-pending U.S. patent application Ser. No. 089,282 filed Aug. 25, 1987, we have described and claimed a baling machine in which it is possible to alleviate the problem of the completed bale fouling the gate without adding to the overall length of the machine. This is accomplished by a structure including a cable connected between the gate and the support by an over-center linkage in one embodiment and by detent structure in other embodiment, the over-center linkage and detent structure both operating to release the support for permitting it to lower only after the gate has raised sufficiently to permit a bale of a predetermined size to pass therebeneath.

However, the structure of our aforementioned U.S. application is not entirely satisfactory since in hilly conditions large cylindrical bales, on being discharged down the ramp, become endowed with a momentum which sometimes results in their continuing to roll too far over the sloping ground.

SUMMARY OF THE INVENTION

According to the present invention there is provided an improvement over the gate-operated bale support member disclosed in the above-identified U.S. patent application.

An object of the invention is to provide a bale support controlled by the opening of the discharge gate in such a way as to prevent a bale being discharged from gaining undue momentum which might result in the bale traveling too far over sloping ground.

More specifically, it is an object of the present invention to provide a gate and support arranged together with interconnecting elements so that the bale support can be held at an intermediate lowered position, corresponding to an intermediate opening position of the gate, at which the bale lodges against the gate after rolling down the support.

These and other objects, features and advantages of the present invention will become apparent to those skilled in the art from the description which follows and from the drawings.

DESCRIPTION OF THE PREFERRED EMBODIMENT

Figure 1:
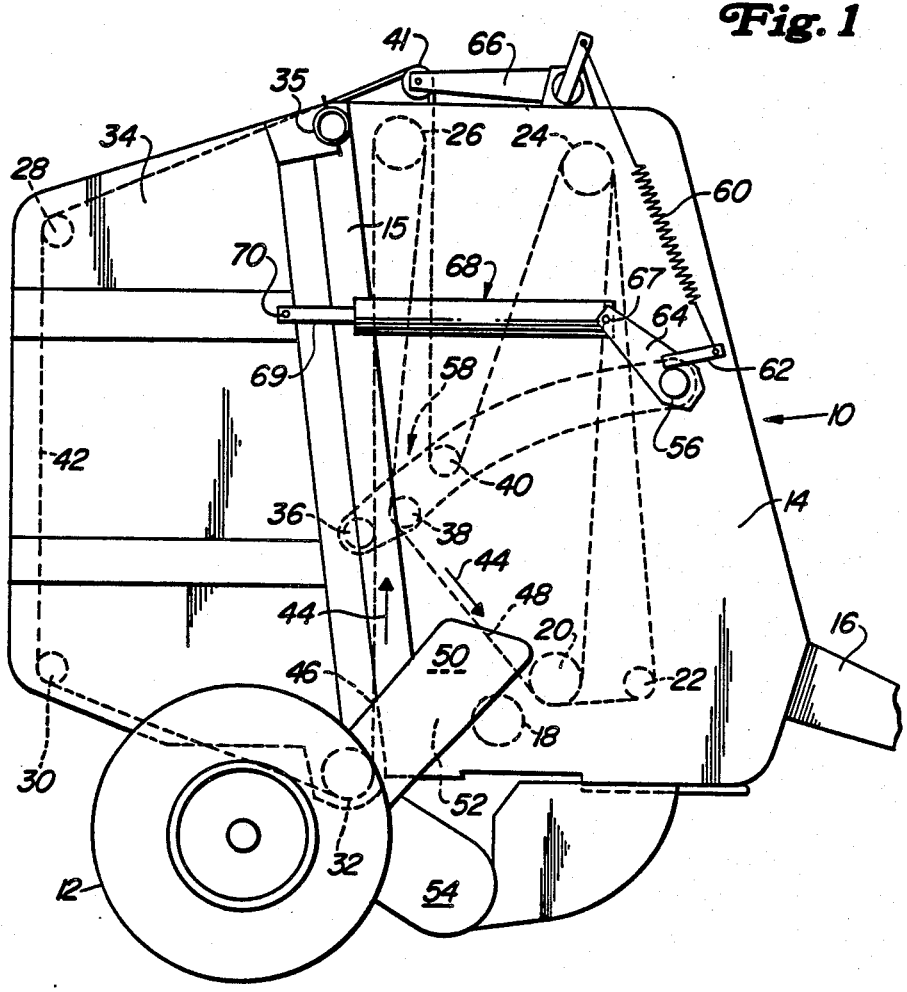
FIG. 1 is a view from the right side of a conventional round baler for forming large cylindrical bales of hay showing in broken lines some details within the machine.

In the drawings, the baler includes a main frame 10 mounted on a pair of wheels of which the right hand one 12 only is shown. The main frame has an upright fore-and-aft extending wall 14 on either side, connected by transverse beams (not shown), with an upright beam 15 at the rearward edge of either wall. A draft tongue 16 is connected to a transverse beam at the front of the frame 10 and extends forwardly for attaching the baler to a tractor (also not shown) which draws the machine.

A plurality of lateral rolls extends over the width of the machine (FIG. 1). One set of rolls 18, 20, 22, 24, 26 is journalled in the sidewalls 14, while another set consisting of rolls 28, 30, 32 is journalled in a gate 34 which is swingable about a pivot axis 35 at the top of the baler. There is also a pair of chamber restricting rolls 36, 38 and two belt take-up rolls 40, 41.

Six rubber belts 42 are trained side-by-side over the rolls, with the exception of the roll 18 which acts as a stripper roll, to provide the configuration shown and they move in the direction indicated by arrows 44, the stripper roll 18 being driven anticlockwise as viewed in FIG. 1. However, alternate belts only are trained over the lower foremost roll 22, while the remaining belts by-pass this roll, to provide a staggered array which is of no significance in relation to the present invention but which is described in U.S. Pat. No. 4,399,746 granted Aug. 23, 1983. Upwardly extending runs 46, 48 of the belts 42 define a bale-forming chamber 50 the ends of which are provided by the sidewalls 14 and gate 34 and which has an inlet 52 for crop received from a pick-up 54 beneath it.

In order to accommodate the increasing diameter of a growing bale core in the bale-forming chamber 50, the size of the chamber must also increase and a belt take-up and tensioning mechanism is provided at either side of the machine. These mechanisms include a pair of rearwardly extending idler arms which are mounted rigidly at the forward end of the main frame 10 on a horizontal transverse shaft 56, providing a pivot connection for the arms, and of which the right-hand arm 58 only is shown; the belt take-up roll 40 which is supported at either end at an intermediate location on the arms 58; and the pair of chamber restricting rolls 36, 38 supported at the free ends of the arms. The arms are biased in an anticlockwise direction (FIG. 1) by a pair of springs, one on either side of the main frame 10, of which only the right-hand spring 60 is shown and only its arrangement will be described, the other being similar. The spring 60 is connected at its lower end by a post 62 to a lever portion 64 of the arm 58, the portion 64 being rigid with the pivot shaft 56, and at its upper end to one arm of a bell crank 66 the other arm of which bears one end of the take-up roll 41. The free end of the lever portion 64 is pivotally connected at a point 67 to the cylinder of a piston and cylinder unit 68, loading the arm 58, of which the piston 69 is in turn pivotally connected to the gate 34 at a point 70, a similar arrangement being provided also on the left-hand side of the machine.

As described thus far the baler is conventional.

Figure 2:
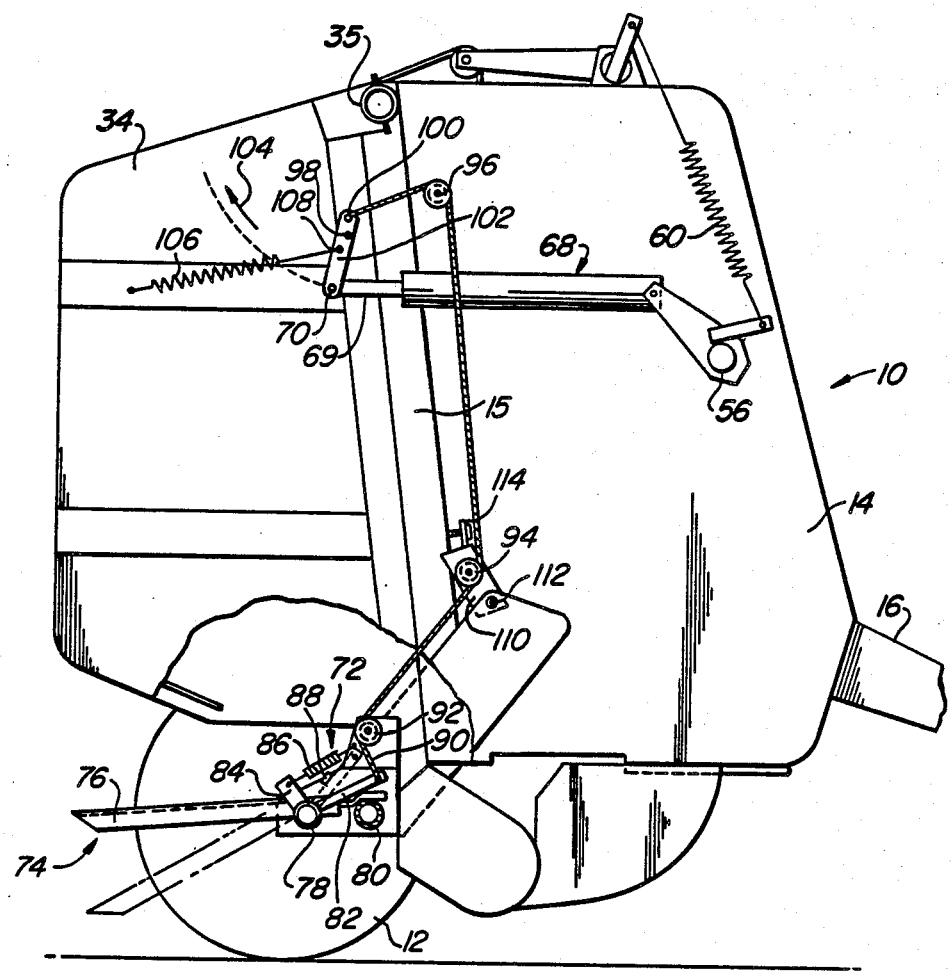
FIG. 2 shows the machine of FIG. 1, also from the right, but with a discharge support arrangement for the completed bale.

In the embodiment shown in FIG. 2, a support arrangement 72 is provided for a completed bale (not shown). This includes a bale support 74 shown in a normal, raised position wherein it is inclined downwardly rearwardly at an angle of five to eight degrees to the horizontal and positioned below the rearward portion of the bale-forming chamber 50, when the latter is at its maximum size for a completed bale, and located about wheel 12 axle level. The support 74 has two longitudinal side beams 76, only the right-hand one being shown, and extends rearwardly but does not protrude beyond the back of the gate 34 so the support 74 is contained well within the confines of the rest of the machine. The support 74 is pivotally mounted at a position towards its forward end by means of a horizontal shaft 78 to which it is rigidly attached. A forward end of the support 74 abuts, when the support is in its normal raised position, a transverse stop bar 80 below it. The bar 80 is in the form of a tube which extends across the machine and carries behind it the axle (now shown) of the wheels.

The following details apply to both sides of the machine, although for clarity only one side will be considered. A forwardly and upwardly extending lever 82 is rigidly connected to the shaft 78 which also has a post 84 rigid with it which extends rearwardly and upwardly. The post 84 is loaded at its free end by a spring 86 anchored to the frame 10. An abutment 88 for the lever 82 is provided to limit the latter's anticlockwise swinging movement brought about by a bale support lowering means, here shown in the form of a cable 90, coupled between the discharge gate 34 and the bale support 74 for effecting lowering of the support about the pivotal mounting of the shaft 78 in response to upward pivotal movement of the gate about the pivot axis 35, the movement of the gate and the support being coordinated by the action of the cable such that bales of different diameters are substantially equally controlled during their discharge. Specifically, the cable 90 is attached to an upper end of the lever 82, passes over lower pulleys 92, 94 and an upper pulley 96 and is selectively attached to points 98 and 100 on an upper portion of a link 102 respectively when the baler is to be opertaed for making somewhat less than full diameter bales and for making substantially full diameter bales. Selection of point 98 causes the support 74 to begin lowering with less upward movement of the gate 34 than is the case when the point 100 is selected, it being noted that the smaller the bale the less movement of the gate is required to discharge the bale thus necessitating quicker lowering of the support in order for the gate to be properly located, if desired, for controlling the discharge of smaller bales. The The lower end of the link 102 is pivoted at the point 70 and so moves with the end of the piston 69 in the direction of arrow 104. In order to take up slack in the cable 90 a spring 106 is connected, at a point 108 intermediate the points 98 and 70, to the lever 102 and is anchored to the frame 10. To provide for fine adjustment of the cable the lower pulley 94 is mounted on a plate 110 pivoted at its lower end at point 112. The plate 110 carries at its upper end a screw adjuster 114 of which the screw abuts the leading face of the upright beam 15.

When the gate 34 is swung by the piston and cylinder unit 68 from its closed position in FIG. 2 it will reach a predetermined intermediate position corresponding to the particular connection point 98 or 100 chosen for attachment of the cable 90 at which the cable will start to pull the lever 82 upwardly against the loading of the spring 86 so that the support 74 assumes, with continued opening of the gate 34, the position shown in broken lines in the Figure whereby the support 74 is swung downwardly about the shaft 78 to a lowered discharge position wherein it forms a discharge ramp for the completed bale. On restoring the gate 34 to the closed position, the spring 86 will return the support 74 to its near horizontal normal raised position.

As the gate 34 opens the bale falls onto the support 74 with its center of gravity between (at a level above) the bar 80 and the horizontal shaft 78. It is therefore stationary until the support 74 starts to swing which occurs when the gate 34 has been opened sufficiently far to align the link 102 with the cable 90 which in the preferred embodiment occurs when the gate is opened about halfway, i.e., when the clearance between the gate and the ground is, say, about one meter. Thereafter the gate 34 and support 74 swing apart and the bale rolls freely through the gate opening to the ground.

In hilly terrain where it is undesirable that the bale should reach the ground in motion, the arrangement is such that if the opening of the gate 34 is stopped by the tractor driver at slightly over one meter clearance from the ground, e.g., at 1.2 meters, then the bale will start rolling down the support 74, but because the gate 34 and support 74 are not now swinging apart, the bale, although it will be deposited on the ground, will be lodged against the gate and so is stopped against further rolling. Next, opening of the gate 34 is restarted and continued until the gate is clear of the bale.

The machine can then be driven away from the bale and finally the gate 34 closed and the baling operation started once more.

If in more gently hilly conditions, it is desired to have some (but not too much) motion for the bale on its reaching the ground the arrangement can be such that the opening of the gate 34 is stopped at a position in which the bale will roll down the support 74 only, say, halfway and then become lodged against the gate. The opening is then continued and the bale rolls down the remainder of the support 74 and so has only a limited momentum on reaching the ground.

Thus, in non-hilly conditions of operation the gate is swung from its closed to its open position in one step and the bale rolls down the length of the support passing through the gate opening without fouling it. However, in hilly terrain the gate is opened initially only to an intermediate position, such that the bale runs down the support, contacts the gate and is stopped. Opening of the gate is then restarted to clear the bale.

We claim:

1. In a baling machine for forming cylindrical bales of crop including a bale chamber defined in part by a bale discharge gate pivotable about an upper front location thereof between a lowered closed position wherein it closes the chamber and a raised open position wherein it allows a completed bale to exit the chamber, a support extending beneath the bale discharge gate and being vertically pivotally mounted for movement about a transverse horizontal axis between a normal raised position and a lowered discharge position wherein it forms a ramp for the bale to roll down, the improvement comprising: bale support lowering means coupled between the support and the discharge gate and responsive to opening of the discharge gate to a predetermined intermediate position between its closed and open positions for permitting a bale to exit the chamber for lowering the support to a corresponding position intermediate its raised and discharge positions whereby the exiting bale engages the gate and thereby has its momentum arrested.

2. A baling machine according to claim 1 in which the intermediate position of the gate and corresponding position of the support are such that the bale rolls fully down the support to the ground before being engaged by the gate.

3. A baling machine according to claim 1 in which the gate is connected to the support via a cable and link, the cable being connected at one end to the support and at the other to the link and the link being connected to the gate so that the support can be swung to the discharge position on the gate pulling the cable and the link.

4. A baling machine according to claim 3 in which the link has a plurality of connection points for the cable corresponding to different predetermined openings of the gate.

5. A baling machine according to claim 4 in which the link is loaded by a tensioning spring so that the link takes up slack in the cable.

6. A baling machine as defined in claim 3 and further including at least one cable guide pulley adjustably pivotally mounted to the frame ahead of the gate and being engaged with a rear surface portion of the cable whereby the effective length of the cable can be adjusted.

7. A baling machine according to claim 1 in which the machine has a transverse bar located forwardly of said axis and which acts as an abutment for the underside of a forward portion of the support that extends forwardly of said axis, the support being disposed so that upon opening of the gate a completed bale will initially rest on the support with its center of gravity between the transverse bar and the pivot of the support.

8. A baling machine according to claim 1 in which the support in its non-discharge position slopes rearwardly and downwardly at an angle of five to eight degrees to the horizontal.

* * * * *